July 5, 1927.

W. LEATHERS 1,634,587

TRACKLESS STREET CAR

Filed Aug. 3, 1920

Witnesses

Inventor
Ward Leathers

July 5, 1927.

W. LEATHERS 1,634,587

TRACKLESS STREET CAR

Filed Aug. 3, 1920

W. LEATHERS

TRACKLESS STREET CAR

Filed Aug. 3, 1920

Witnesses

Inventor
Ward Leathers

Patented July 5, 1927.

1,634,587

UNITED STATES PATENT OFFICE.

WARD LEATHERS, OF HAWORTH, NEW JERSEY.

TRACKLESS STREET CAR.

Application filed August 3, 1920. Serial No. 401,048.

My invention differs from other street cars in that it is of the stepless type yet carried on rubber tired wheels of necessarily larger size than the street car wheels used on tracks. It differs from all other automobile buses in that there is an engine for each wheel attached thereto and there are no axles between opposite wheels.

The object of my invention is obviously to produce a passenger or freight carrier of suitable form to handle rapidly and conveniently large load or many passengers, capable of traveling without rails on any suitable pavements, and propelled by self-contained power.

The further object of my invention is to obtain a sufficient contact with the ground by a sufficient number of wheels with equalizers between them to modulate the irregularities of the ground. This result is obtained by means of 8 wheels equalized in tandem pairs as illustrated.

A further object of my invention is to drive, brake and steer each of the 8 or more wheels. A further object of my invention is to get all prime movers used for driving the vehicle supported on the wheels with spring or pneumatic suspension between these prime-mover-wheel-units, and the passenger or freight carrying body. A further object of my invention is the simple automatic steam cycle illustrated wherein high pressure high superheat steam is always available at automatically regulated pressure and temperature, and wherein the auxiliaries are independently driven by steam or other prime movers. The auxiliaries are naturally those common to a steam driven vehicle or craft, fuel, air, water, lubricating oil, pumps, generator, compressor, condenser, fan, etc. A further object of my invention is to enable the steering of a vehicle of more than four wheels and no axles in such manner that each of the wheels will assume a position, at all times when turning, at right angles to a radius from the turning center of the entire vehicle.

A further object of my invention is to support the passenger carrying body upon pneumatic cylinders.

A further object of my invention is to provide means whereby when pneumatic tires are used a flat or soft tire will indicate its condition to the engineer, highly necessary with a vehicle of many wheels.

I hereby further and more completely describe my invention in conjunction with several drawings in which.

Figure 1:
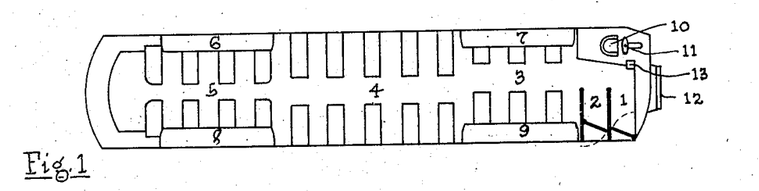
Fig. 1 is a floor plan for one of my cars designed to be operated by one man.
Figure 2:
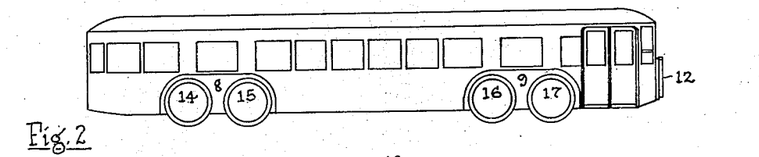
Figure 2 is a side elevation of the same.

In Figure 1 I have provided an entrance aisle 1, with an exit aisle 2—a wide aisle 3 off center to permit the seating of 2 passengers on one side and 1 on the other. A wide aisle 4 thru the center of the car and a narrow aisle 5 serve the seats farthest from the door. The spaces 6, 7, 8 and 9 accommodate the wheels. The doors to passengers 1 and 2 are operable individually preferably pneumatically by the operator whose seat is shown at 10. 11 is a steering wheel. 12 is a radiator. 13 is the coin box. This plan seats approximately 50.

In Figs. 2, 14, 15, 16 and 17 are the wheels, the outsides of which may be flush with the side of the car.

Figure 3:
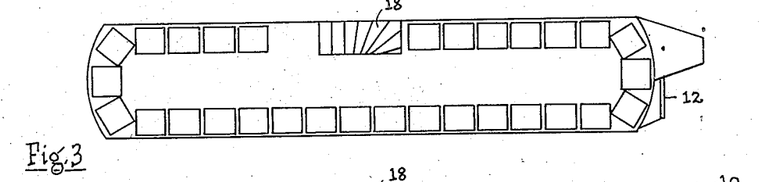
Figure 3 is a floor plan for the upper deck of one of my double deck two man operated cars.
Figure 4:
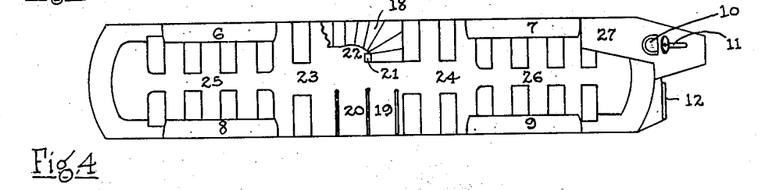
Figure 4 is a floor plan for the lower deck of the same.

In Fig. 3 I have shown an arrangement for the upper deck in which arm chairs are arranged with their backs to the windows. By such arrangement approximately 30 such comfortable chairs may be provided in the deck above. The deck below of similar size seating approximately 50 as illustrated in Fig. 4 where 18 is a stairway. The object of this design is to provide a chair service with more than usual comfort with possibly carpeted floor in similar manner to the Pullman railway chair service and for which additional fare might be charged.

Figure 4 is a floor plan for the first deck of a double deck car. 19 is the entrance passage. 20 is for exit. 21 is the coin box, 22 is the space wherein the conductor may stand. 23 and 24 are the wide aisles in the center of the car while 25 and 26 are narrow aisles on the end. The upper deck of this car may have its seating arrangement similar to that shown in Fig. 4 but since no wheel spaces 6, 7, 8 and 9 are required considerably more room is available and while one seat is eliminated at the head of the stairway others may be provided in the space occupied by the entry and exit ways. 10 and 11 are the driver's seat and driving wheel which in the two man bus would preferably be completely enclosed while in the one man bus the driver's space would be open to the passenger space. 27 is the space occupied by the boiler and auxiliaries hereinafter described.

Figure 5:
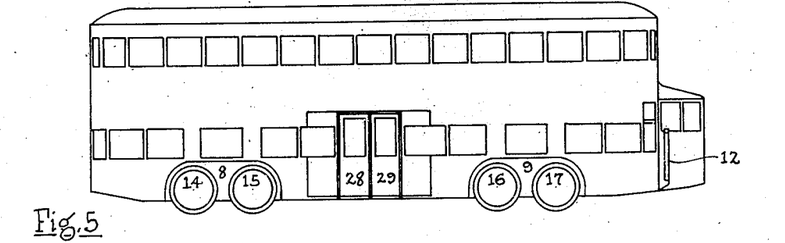
Figure 5 is a side elevation of the same.

In Fig. 5 slide doors are provided at 28 and 29. All doors may be operated pneumatically or otherwise as desired.

Figures 6, 7:
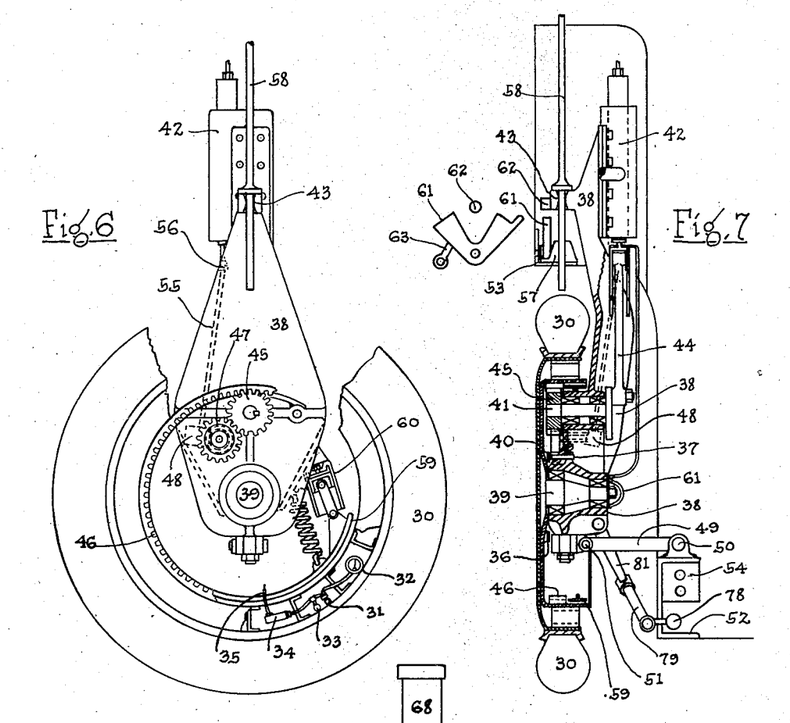
Figure 6 is a partly dissected side view of one of the reciprocating-engine-wheel units.
Figure 7 is a cross section of the same.

In Fig. 6, 30 shows a pneumatic tire, 31 the usual valve stem not provided with a valve. 32 is a pressure gauge connected therewith, 33 is a loading plug provided with the usual tire valve. 34 is a pressure operated device so designed that it permits of the making of an electric contact when the pressure therein falls below a predetermined point. 35 is a single insulated electric conductor connected to an insulated contact point inside 34. The other contact point is grounded to the wheel so that a single wire may be used for establishing a complete circuit. The wire 35 is connected to an insulated ring 36 in Fig. 7 on which slides a spring finger 37 carrying an electric contact which in turn is connected by a single insulated wire to a lamp, buzzer or other indicating device visible or audible to the engineer. When through puncture or leakage the air pressure in tire 30 falls below a predetermined pressure a circuit is established at 34 which permits current to pass from a battery through the indicator which represents one or all the tires through the contact 37 to the ring 36 to the pressure operated contact 34 to ground and back to battery. Thus the engineer is immediately informed of a soft or flat tire.

In Figs. 6 and 7, 38 is a casting or forging forming a wheel carrying member which holds within itself support for the spindle 39 which is made integral with the wheel 40. It holds support for the drive shaft 41, the steam cylinder and valve mechanism 42, and the upper support 43 which has support rod 58 flexibly connected to it. Thrust exerted in the cylinder is transmitted by means of the connecting rod 44 to the drive shaft 41, attached to the spur 45, which meshes with the internal gear 46. Meshed with the spur 45 is a gear 47 which rotates the valve in 42 through a shaft, a mitre gear 48, a shaft 55, and a flexible connection 56. The steam cylinder and valve mechanism 42 is more completely illustrated in Figs. 8 and 9. 49 is a triangular wheel spacer, joined to the car frame at 50 and flexibly connected to the part 38 at 51. 52 and 53 are main side frames of the vehicle. 54 is a space in which control pipes and wires may pass, also exhaust steam for heating purposes. 57 is a bearing in which the support rod or tube 58 slides vertically. 58 is supported at its upper end by springs upon which the vehicle is carried or by pneumatic cylinders as illustrated in Fig. 14. 59 is an internal expanding brake, expanded by the compressed air cylinder 60 supplied with compressed air from any desirable source. The air is admitted, when desired, from a suitable reservoir, by means of a throttle or valve within the reach of the engineer's hand or foot, and a pipe or tube which connects said throttle with the cylinder 60. Obviously all the wheels on the vehicle may be similarly connected to the same valve if desired. The valve is so arranged that one position exhausts the air from the tubes and the cylinders 60. The hub 61 is turned toward the vehicle instead of away from it in order to get a more compact structure and to avoid protrusion on the outside.

It is evident, by referring to Figs. 6 and 7 that if the hub-cap and nut are removed the wheel may be instantly removed. The wheel including tire 30, rim, which may be demountable, internal gear 46, contact ring 36, and spindle 39, 31, 32, 33, 34, 35 all remove. The spur 45 disengages from the internal gear 46, and the contact ring 36 from the spring contact finger 37, in the direction of wheel removal. Naturally the removable wheel units described may be readily interchangeable.

61 is a rotatable dog shown in end view in Fig. 7 and in side view immediately to the left thereof. 63 is any suitable means for holding the dog 61 in the inoperable position shown. With 63 removed, 61 may be moved to such location that it will arrest 62 in its free upward and downward movement. 62 is integral with 38 which normally goes up and down with the wheel. In case of soft or flat tire a car operator may turn the latch 63 and the dog 61 so that the tire 30 will be partially or entirely relieved of the duty of carrying the vehicle. As irregularities in the ground raise the wheel in increments, the dog keeps it from going downward, thus automatically lifting the tire from the road. This simple device makes it possible to bring the vehicle to such control station as can supply a fresh tire or fresh wheel, without needlessly injuring the exhausted tire by heavy duty on the ground.

Figure 8:
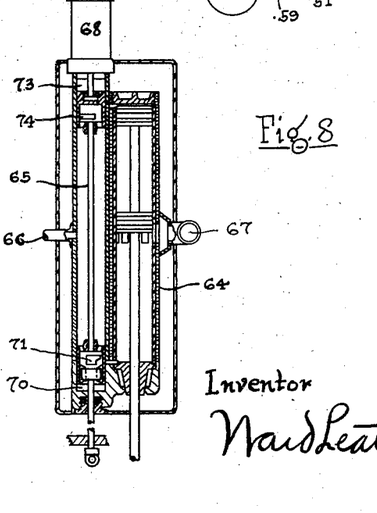
Figure 8 is a cross section of the engine cylinder and valve.

The cylinder and valve assembly shown at 42 in Figs. 6 and 7 is shown in section in Fig. 8.

In Fig. 8, 64 is a cylinder casting or steel housing for a single-cylinder, double-acting, uniflow engine with center circumferential exhaust. It is equipped with a cast iron lining. 65 is a cylindrical steam chest from which the steam is admitted to either end of the power cylinder by a rotating valve. Three valve positions are provided, normal, increased inlet period, and reverse. Increased inlet period is obtained by forcing the valve mechanism down; reverse by raising it. A sliding connection is provided at the bottom where rotary motion is supplied by the shaft 55 and the flexible connection 56. Steam inlet is shown at 66 and exhaust at 67. 68 is the pneumatic valve actuator illustrated in Fig. 9.

Figure 9:
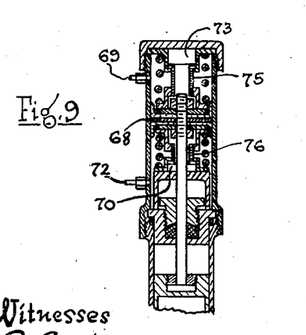
Figure 9 is a cross section of a pneumatic valve-thrower for same.
Figures 10, 11, 12, 13, 14:
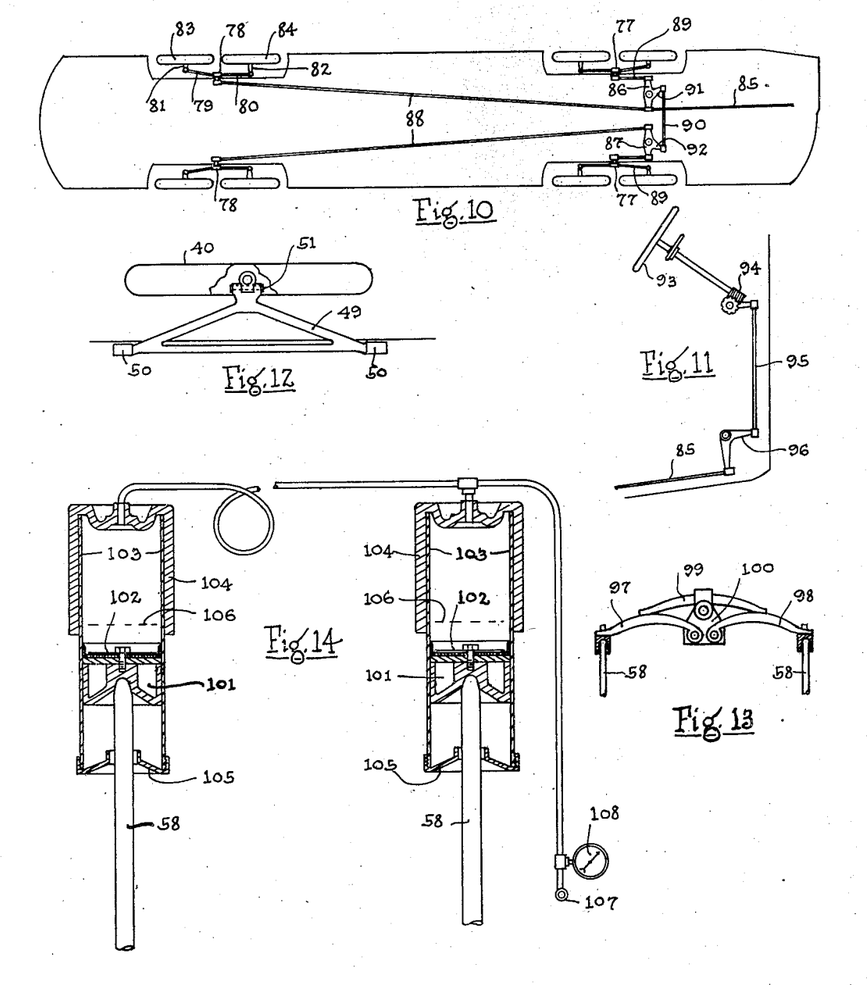
Figure 10 is a partial diagram of the steering connections.
Figure 11 is the same.
Figure 12 is a wheel spacer.
Figure 13 is a cross section of a pair of equalizing spring supports.
Figure 14 is a diagram of the steam-power and air-control systems.

In Fig. 9, 68 is a piston supplied on its upper and lower surfaces with a pressure cup ring. When compressed air is supplied at 69, the piston is forced downward the distance indicated at 70. This brings into registry with the inlet cylinder ports longer valve openings as shown at the top of the opening 71 in Fig. 8. When compressed air is admitted at 72, in Fig. 9, the piston 68 is forced upward a distance shown at 73. This brings the valve ports 74, in Fig. 8 into registry with the inlet cylinder ports. 75 and 76 in Fig. 9 are collapsible spring cages, which permit the centering springs shown to be compressed the desired distance but restricting their expansion to the center or normal position shown in the drawing. The valve openings 71 and 74 are so disposed on the rotating element that they accomplish the three functions described.

Naturally air, steam or other gas under compression may be supplied at 69 and 72 from any suitable source through valves under the control of the car operator, and tubes connected thereto.

In Fig. 10, I have shown diagrammatically the location of eight road wheels on the car and means for steering them. 77 and 78 are sliding guides to which are connected steering rods as at 79 and 80. The usual steering arm rigidly attached to the wheel unit is shown at 81 and 82. It will be noted that 81 is shorter than 82 and it is evident that when the guide 78 moves forward or backward the wheel 83 turns through a greater angle than the wheel 84. The other three pairs of tandem wheels are similarly arranged. As the rod 85 is moved forward or backward by the steering gear shown in Fig. 11 the bell-cranks 86 and 87 are rotated about center bearings pushing or pulling on the steering rods 88 and 89 connected to the guides 77 and 78. It is evident from the drawing that when the four wheels at one end of the car are turned in one direction the four at the other are turned proportionately in the other. This proportion may be altered to almost any desired extent by moving the rotating center of the bell-cranks 86 and 87 sidewise, nearer to or farther from the points of attachment of the steering connection rods 88 and inversely with respect to the rods 89. The connecting rod 90 is so attached to the bell-cranks 86 and 87 that as 86 rotates 87 also rotates in the same direction but not the same degree. In order that the wheels may always be at right angles to a radius drawn through the center of turn, when the vehicle is turning, it is necessary to turn the wheels on the inside of the turn a greater degree than those on the outside. The arms 91 and 92 on the bell-cranks 86 and 87 are set at such angle thereto that as one approaches a position where its arc of travel is nearest tangent to the connecting rod 90 the other is farthest from that position. Since the throw of the arm is greater at the tangent position, the wheels on the inside of the turn are turned through the greater angle. In Fig. 11, 93 is a steering wheel, 94 a usual worm gear which by means of a rod 95, and a bell-crank 96, transmits its motion to the rod 85. Obviously this car can be equipped with 4, 6, 8 or more wheels as desired if the steering connections are so arranged that the wheels always maintain right angles to the radius of turn.

In Fig. 12, I have illustrated a triangular wheel spacer by which the wheel 40 is kept at the proper distance from the side frame of the car, permitting the wheel free vertical movement, and allowing ample steering turn. 49 is the spacer, made of forging or steel casting, or built-up tubing. It has two hinges at 50 with the car frame, and is pivotally attached at 51 in any suitable manner which permits of the successful operation of the functions just mentioned.

In Fig. 13, 58 is the same support rod that is shown in Figs. 6 and 7. The weight of the car, exclusive of the wheel units, rests on these rods. Naturally there is one rod to each wheel unit. The weight is carried on the upper end of the rod through any suitable yielding means such as springs shown in Fig. 13, or pneumatic cylinders shown in Fig. 14. These yielding means may be located in any suitable location, as for instance behind the space now usually used for advertising purposes in street cars. Where springs are used some suitable equalizing arrangement between tandem pairs of wheels is highly desirable. A suitable arrangement is shown in Fig. 13. The semi-elliptical springs at 97 and 98 are supported at their inner ends and the spring 99 at the center by a support 100, in fixed relationship. The ends of the spring 99 slide on lubricated surfaces on the top of springs 97 and 98 when the springs are being compressed. The support 100 is attached rigidly to the main frame of the car in suitable manner. The rods 58 are attached to the springs 97 and 98 in suitable manner, such as ball and socket joints.

In Fig. 14, I have illustrated a pneumatic support for my car. The rods 58, previously described, fit in ball and socket joints, in a piston 101. The piston is supplied with compression cup packing 102 on its upper surface, and slides in a cylinder 103, jacketed at 104 for greater strength. 105 is a loosely fitting rod guide and oil drip catcher. The dotted line 106 indicates the oil level, oil being used to prevent air leakage. The cylinders 103 are provided with compressed air by any suitable means, constantly, or periodically, automatically, or manually. I have shown a simple loading valve 107 and a pressure gauge 108. One of the most important elements in my arrangement consists of having the cylinders over tandem pairs of wheels in constant pneumatic intercommunication so that the air may pass from one to the other as it performs the function of equalization.

Figure 15:
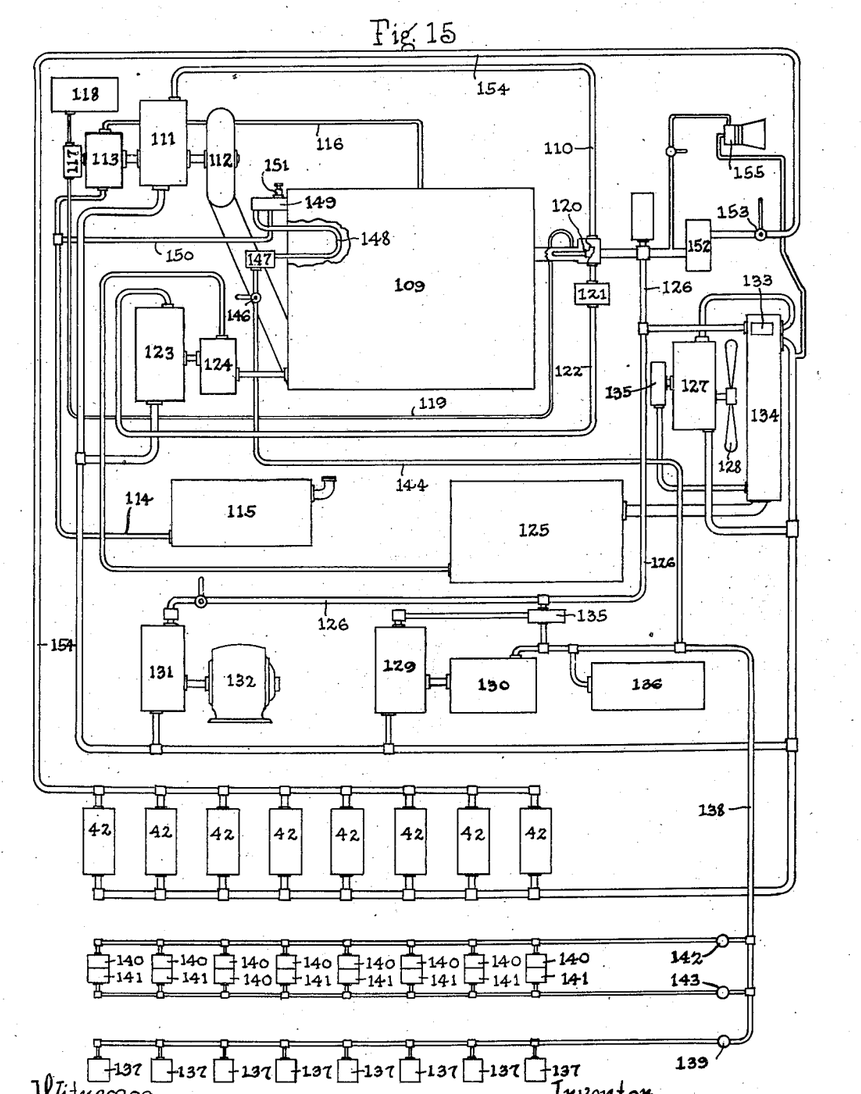
Figure 15 is a diagrammatic representation of a steam power plant for this automotive vehicle together with a pneumatic system for same.

In Fig. 15 I have shown a suitable steam power and compressed air system for my car. 109 is the boiler or steam generator, from which steam is supplied through the pipe 110 to the prime mover, preferably a worm-geared steam turbine 111, such as is shown in my patent application Serial Number 395,222, which drives the air pump or blower 112, which furnishes air for combustion to the generator. 111 also drives the fuel pump 113, here shown obtaining hydrocarbon fuel through the pipe 114 from a fuel tank 115, and pumping it to the generator through the pipe 116. 113 may also be any suitably designed and suitably driven conveyor for the supplying or pulverized coal. Also suitably geared to 113 is a lubricating oil pump 117, with a supply of oil shown at 118, and the oil pumped into the steam line through the pipe 119. This arrangement is in common use where reciprocating engines are used. Where turbines are used some oil is useful in the boiler water in order to avoid scale in the boiler tubes.

120 is a thermally operated device of well-known type placed in the main steam supply pipe or steam separator. Its function is to open the valve which permits steam to enter the pipe 110 when the temperature of the steam in the supply pipe or steam separator is below a predetermined point, and to restrict or to close same when the temperature is above that point. 121 operates in similar manner in admitting steam to the pipe 122, except that it is pressure operated, admitting steam only when pressure is below a predetermined point and checking or stopping its flow when pressure is above that point.

Through the pipe 122 steam reaches the prime mover 123, preferably the type of turbine referred to, which drives the water pump 124 which obtains water from any suitable source as for instance the water tank 125 and pumps it into the boiler.

Through the pipe 126 steam is supplied to the prime movers, preferably turbines, 127 which drives the condenser fan 128, 129 which drives the air compressor 130, and 131 which drives the electric generator 132. Steam for the prime mover 127, however, passes through a thermally controlled valve 133, similar in action to 120. When the temperature in the condenser 134 exceeds a predetermined point, steam is admitted to 127, when the temperature is below that point steam is automatically shut off from 127. 135 is an air pump, driven by 127, for ejecting air from the condenser. The prime mover 129 may also obtain its motive fluid through an automatic pressure valve 135' from the steam line. The air pump 130 stores air in flask 136 but when that pressure exceeds a predetermined point it stops the admission of steam to 129 by means of the pressure valve 135'.

Compressed air from the flask or storage tank 136 is admitted to the air brake cylinders 137, further illustrated at 60 in Fig. 6, through the supply pipe 138 and the throttle 139. It is supplied to the "delayed-cut-off" 140 and "reverse" 141 operating cylinders, illustrated respectively at 75 and 76 in Fig. 9, through the pipe 138 and the throttle valves 142 and 143. The valves 139, 142 and 143 are so constructed that when in normal position they exhaust to the atmosphere any compressed air in the cylinders 137, 140 and 141, but close such exhaust port when admitting pressure to or holding pressure in said cylinders in similar manner to the air-brake valves used on street cars.

Compressed air from the supply at 136 passes through the pipe 144, the throttle 146, the reduction valve 147, the heater 148, and the injector 149 to the combustion chamber of the boiler. A hydrocarbon fuel may be supplied through the pipes 114 and 150 from any suitable source such as a tank for such special fuel, where pulverized fuel is used for steaming purposes, and injected into the combustion chamber by the compressed air, for the purpose of maintaining a pilot light. 151 illustrates any suitable ignition device such as electric.

Steam from the device 120 passes through the automatic valve 152 which restricts or stops the flow of steam when the pressure is below a predetermined point, past the throttle 153 and thence through the pipe or pipes 154 to the prime mover on the wheels 42, more fully illustrated in Figs. 6 and 7 and 8 or at 156 in Figs. 16, 17, 18, 19, 20, 21.

The prime movers 42, 111, 123, 127, 129, 131 exhaust into a common exhaust which is led to the condenser as illustrated.

155 is a steam turbine driven signal horn of the ratchet or siren type.

Figures 16, 17, 18:
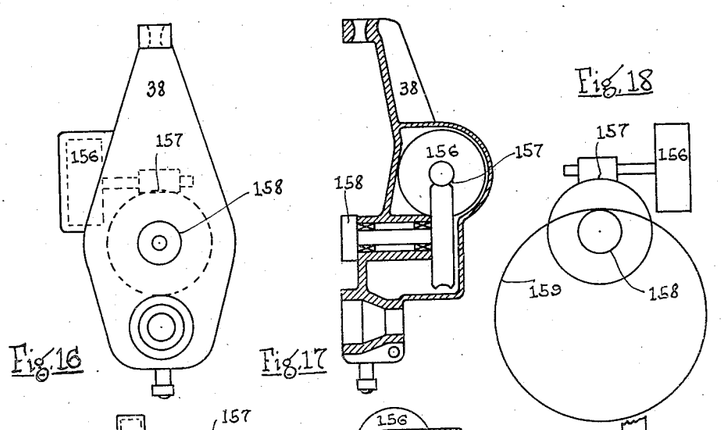
Figure 16 is an elevation of the wheel support member showing diagrammatically a steam turbine drive.
Figure 17 is a cross-section of same.
Figure 18 is a diagram showing reduction gears for turbine drive.

Figs. 16, 17 and 18 show diagrammatically the unit-power-wheel arranged to be driven by a turbine. In these three figures the reduction is obtained from the turbine 156 through a worm and worm-gear 157 which drives the spur 158, which meshes with the internal-gear 159, which is attached to the wheel as more completely illustrated in Fig. 6 in which 45 corresponds to 158 and 46 corresponds to 159.

Figure 19:
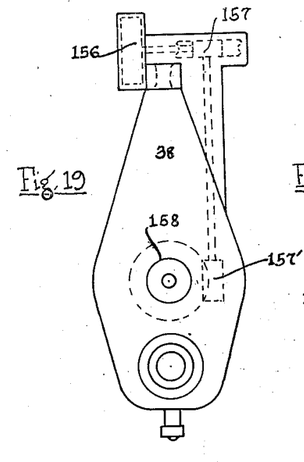
Figure 19 shows the turbine drive at the top.
Figures 20, 21:
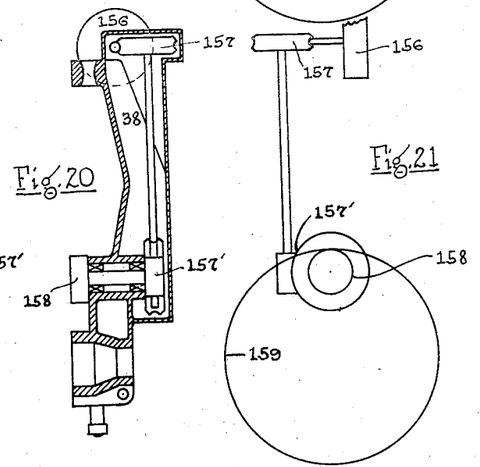
Figure 20 is a cross-section of same.
Figure 21 is a gear reduction diagram for same.

In Figs. 19, 20 and 21, I have shown diagrammatically the unit-power-wheel with the speed reduced and the power transmitted from the turbine to the wheel through two worm-gears and an internal-gear. Herein power is transmitted from the turbine 156 through the worm-gear 157, the worm gear 157', the spur-gear 158, and the internal-gear 159 attached to the wheel.

Figures 22, 23:
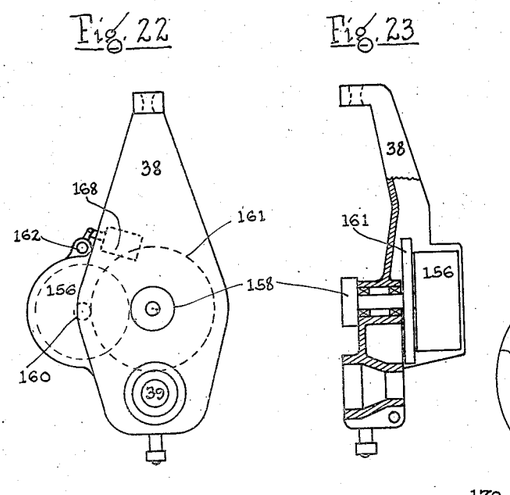
Figure 22 shows an elevation of the wheel support member with a turbine gear reduction drive.
Figure 23 is a cross-section of same.
Figure 24:
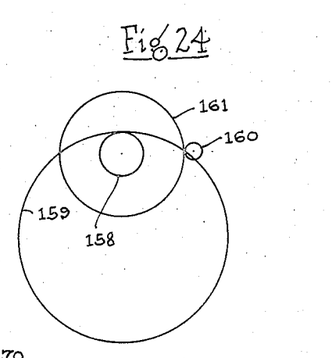
Figure 24 is a gear reduction diagram for same.

In Figs. 22, 23 and 24 I have shown the speed reduced and the power transmitted from the turbine to the wheel through a gear reduction and an internal-gear reduction. Here the turbine 156 drives the spur 160 which meshes with the gear 161, which drives the spur 158, which meshes with the internal-gear 159, which is attached to the wheel.

Figure 25:
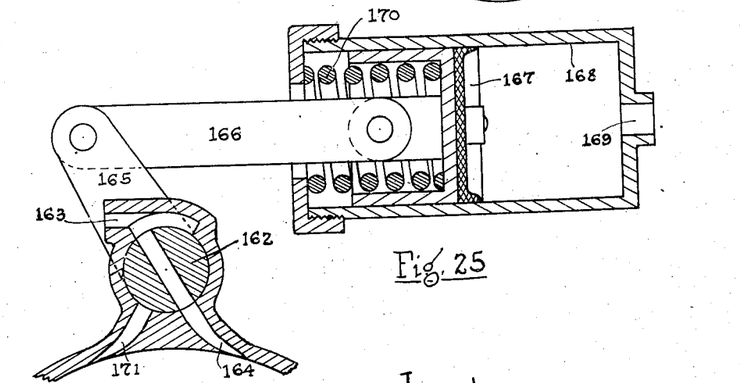
Figure 25 is a diagrammatic cross section of pneumatically reversed turbine valve.

In Fig. 25 I have shown a simple type of reversing gear, some form of which will be necessary where the unit-turbine-driven-wheel is used. 162 is a valve which permits steam entering at 163 to flow to the turbine "reverse" nozzle 164. 162 is held in this position by a lever 165 and an arm 166 connected to a piston 167 in a cylinder 168. Compressed air admitted at 169 holds the piston in the position shown with the spring 170 compressed. When the air pressure in 168 is exhausted the spring 170 throws the valve 162 to the normal or "forward" position wherein steam admitted at 163 may flow to the "forward" nozzle 171. This entire mechanism may be located in any suitable place next the turbine as for instance as shown in Fig. 22. Compressed air for operating this reverse mechanism may be supplied and exhausted by a manually operated three-way valve as at 142 in Fig. 15 and in such manner as the cylinders 140 are supplied and exhausted.

Having clearly set forth the principles underlying my invention I wish it understood that innumerable variations, and applications may be found by those skilled in these arts without departing from the spirit of my invention, for instance the worm-gear 157 in Fig. 20 may be replaced by the turbine itself with a vertical shaft, or the turbine 156 may be in two parts, one on each end of the worm-shaft that forms part of the gearing 157. It is also possible and may in some cases such as in heavy motor trucks be highly desirable to mount the turbine 156 and the gearing 157 (Fig. 20) or their equivalent, such as the two just mentioned, on the main frame of the vehicle (53 in Fig. 7) thus carrying the prime movers as part of the sprung-load. In this case the vertical shaft which connects 157 with 157' will require the usual flexible connections at the ends and some suitable type of telescoping joint or connection such as a splined joint which will permit of the up and down movement of the wheel-unit. With such arrangement it will be desirable to move the gearing 157 and the spur 158 around the main wheel axis to such location that the vertical drive shaft will be as nearly as possible coincident with the axis around which the wheel is turned for steering.

Right-angled bevel gears as used in automobile rear axles may be used in Figs. 19, 20, and 21 by placing the vertical shaft in the center and dispensing with the gearing 157 and the internal gearing the spur for which is 158. The bevel arrangement would naturally have the large bevel gear drive the main wheel shaft (shown at 39 in Fig. 7). With the bevel gearing at the wheel numerous other combinations of worm- and spur-gear reductions are possible yet they are all clearly encompassed by my invention.

I claim:

1. In a trackless street car a pair of tandem wheels supporting each corner of the vehicle, each wheel provided with independent means for turning on a vertical axis, each wheel provided with means for independent movement with respect to the frame of the car, said movement describing an arc in a plane transverse to the vehicle, said arc being maintained by a spacing member horizontally and longitudinally pivot-journalled to the main frame of the vehicle and supporting at its outer portion the wheel spindle vertically journalled thereto, all said eight wheels steering simultaneously.

2. In a trackless street car, a pair of tandem wheels supporting each corner of the vehicle, each wheel provided with independent means for turning on a vertical axis, each wheel provided with means for independent movement with respect to the frame of the car, said movement describing an arc lying in a vertical plane transverse to the vehicle, said arc being maintained by a spacing member horizontally and longitudinally pivot-journalled to the main frame of the vehicle and supporting at its outer portion the wheel spindle vertically journalled thereto, pneumatic support between each wheel and the frame of the vehicle with a flexible means of translating the arc-movement into a direct vertical movement in said pneumatic supports.

3. In a trackless street car, a pair of tandem wheels supporting each corner of the vehicle, each wheel provided with independent means for turning on a vertical axis, each wheel provided with means for independent movement with respect to the frame of the car, said movement describing an arc lying in a vertical plane transverse to the vehicle, said arc being maintained by a spacing member horizontally and longitudinally pivot-journalled to the main frame of the vehicle and supporting at its outer portion the wheel spindle vertically journalled thereto, a pneumatic support between each wheel and the frame of the vehicle, and means of pressure compensation between said pneumatic supports of tandem pairs of wheels.

4. In a trackless street car, a pair of tandem wheels supporting each corner of the vehicle, each of said wheels provided with pneumatic support means for said vehicle, each of said wheels being provided with a wheel carrying member, said wheel carrying member vertically pivoted on its upper end, and operably related to a pneumatic support cylinder, said wheel carrying member provided at its lower end with a vertical pivot journal, said journal held properly spaced from the main frame of the vehicle by a spacing member horizontally pivot-journalled to the main frame of the vehicle.

5. In a trackless street car, a pair of tandem wheels supporting each corner of the vehicle, each of said wheels provided with pneumatic support means for said vehicle, said pneumatic support means pneumatically interconnected between pairs of tandem wheels, each of said wheels being provided with a wheel carrying member, said wheel carrying member vertically pivoted on its upper end, and operably related to a pneumatic support cylinder, said wheel carrying member provided at its lower end with a vertical pivot journal, said journal held properly spaced from the main frame of the vehicle by a spacing member horizontally pivot-journalled to the main frame of the vehicle.

6. In a trackless car, a plurality of wheel assembly units incorporated in each wheel assembly unit, each wheel assembly unit being secured independently in the side of the car, said wheel assembly units being arranged in groups, the wheel assembly units in each group being arranged in tandem relation, each wheel assembly unit being provided with a pneumatic support for said car, said pneumatic supports in each of said wheel assembly groups being provided with means for pneumatic intercommunication and equalization.

7. In a trackless street car, a pair of tandem wheels supporting each corner of the vehicle, each with its own individual assembly for vertical movement with respect to the frame of the vehicle, each of said units being provided with an independent wheel carrying member, said wheel carrying member being provided with vertical pivot means, a pneumatic vehicle-supporting means and a horizontally hinged member, said horizontally hinged member being operably connected to the wheel unit for keeping it at a suitable distance from the vehicle frame.

WARD LEATHERS.